(12) United States Patent
Matveenko et al.

(10) Patent No.: US 8,135,581 B2
(45) Date of Patent: Mar. 13, 2012

(54) METHOD AND SYSTEM FOR DOWNLOADING ADDITIONAL SEARCH RESULTS INTO ELECTRONIC DICTIONARIES

(75) Inventors: Anna Matveenko, Moscow (RU); Alexander Rylov, Moscow (RU)

(73) Assignee: ABBYY Software Ltd, Nicosia (CY)

( * ) Notice: Subject to any disclaimer, the term of this patent is extended or adjusted under 35 U.S.C. 154(b) by 309 days.

(21) Appl. No.: 12/540,148

(22) Filed: Aug. 12, 2009

(65) Prior Publication Data

US 2010/0042617 A1 Feb. 18, 2010

Related U.S. Application Data

(60) Provisional application No. 61/088,191, filed on Aug. 12, 2008, provisional application No. 61/088,199, filed on Aug. 12, 2008.

(51) Int. Cl.
*G06F 17/21* (2006.01)

(52) U.S. Cl. .............. 704/10; 704/2; 707/736; 707/758; 715/259

(58) Field of Classification Search ........................ None
See application file for complete search history.

(56) References Cited

U.S. PATENT DOCUMENTS

| | | | |
|---|---|---|---|
| 5,995,922 A | 11/1999 | Penteroudakis et al. | |
| 6,128,635 A | 10/2000 | Ikeno | |
| 6,173,253 B1 * | 1/2001 | Abe et al. | 704/10 |
| 6,282,508 B1 * | 8/2001 | Kimura et al. | 704/10 |
| 6,490,576 B1 * | 12/2002 | Nishiguchi | 1/1 |
| 6,651,220 B1 | 11/2003 | Penteroudakis et al. | |
| 6,735,559 B1 | 5/2004 | Takazawa | |
| 6,772,139 B1 * | 8/2004 | Smith, III | 707/748 |
| 6,789,057 B1 * | 9/2004 | Morimoto et al. | 704/2 |
| 6,961,722 B1 | 11/2005 | Bruecken | |
| 7,233,950 B2 * | 6/2007 | Smith, III | 1/1 |
| 7,296,229 B2 * | 11/2007 | Berstis | 715/259 |
| 7,313,516 B2 | 12/2007 | Oshima | |
| 7,627,816 B2 * | 12/2009 | Bhogal et al. | 715/259 |
| 7,825,901 B2 * | 11/2010 | Potera | 345/171 |
| 7,827,165 B2 * | 11/2010 | Abernethy et al. | 707/708 |
| 2004/0006460 A1 * | 1/2004 | Katayama et al. | 704/10 |
| 2004/0210435 A1 * | 10/2004 | Oshima | 704/10 |
| 2007/0168182 A1 * | 7/2007 | Abe | 704/10 |
| 2007/0192318 A1 * | 8/2007 | Ramer et al. | 707/7 |
| 2007/0219782 A1 | 9/2007 | Li | |
| 2007/0250587 A1 * | 10/2007 | Roberts | 709/206 |
| 2009/0282007 A1 * | 11/2009 | Abe | 707/3 |

* cited by examiner

*Primary Examiner* — Hung Le

(74) *Attorney, Agent, or Firm* — John C. Meline

(57) ABSTRACT

In one embodiment, the invention provides a method for a system to provide information based on a query, the method comprising: performing a first search of at least one first source for information responsive to the query; providing a result of said search to a user; based on user input, performing a second search of at least one second source for information responsive to the query; and providing a result of said second search to the user.

19 Claims, 7 Drawing Sheets

FIG. 2A

METHOD AND SYSTEM FOR DOWNLOADING ADDITIONAL SEARCH RESULTS INTO ELECTRONIC DICTIONARIES

This application claims the benefit of priority to U.S. Patent Application Nos. 61/088,191 and 61/088,199 both of which were filed on Aug. 12, 2008, the entire specifications of which is incorporated herein by reference.

FIELD

Embodiments of the present invention are directed towards the implementation of a method and system for displaying search results in search engines, text corpora, and electronic dictionaries.

BACKGROUND

Electronic dictionaries may comprise a software program and dictionaries proper. The software program may include a shell, which provides a graphical user interface, morphology models to display inflected forms, context search that uses an index, a teaching module, etc. The dictionaries may comprise separate units—either text or compiled files.

The software program may be installed locally on a user's computer, remotely on a server in a local area network or on a wide area network such the Internet. The dictionaries that the user needs to use may be independently stored in different locations.

SUMMARY

In one embodiment, the invention provides a method for a system to provide information based on a query, the method comprising: performing a first search of at least one first source for information responsive to the query; providing a result of said search to a user; based on user input, performing a second search of at least one second source for information responsive to the query; and providing a result of said second search to the user.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

FIG. 2A shows a graphical user interface (GUI) to facilitate local and online dictionary searches, in accordance with one embodiment of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments of the present invention disclose a dictionary device that allows a user to obtain translations from additional sources, e.g. dictionaries, only when the user really needs these translations. For example, if the user has not found a suitable translation based on a first search of existing dictionaries, the user can click on a link and obtain search results from additional dictionaries. The term "dictionary" as used herein refers to local or online electronic dictionaries, and other intranet- or internet resources, such as, text corpora, trademark-bases, forums, online-encyclopedias and other search results.

Additionally, the user can customize the list of additional dictionaries in accordance with the user's preferences. The user may not know which dictionaries are installed locally and which are installed remotely if an active network connection is accessed.

Figure 1:
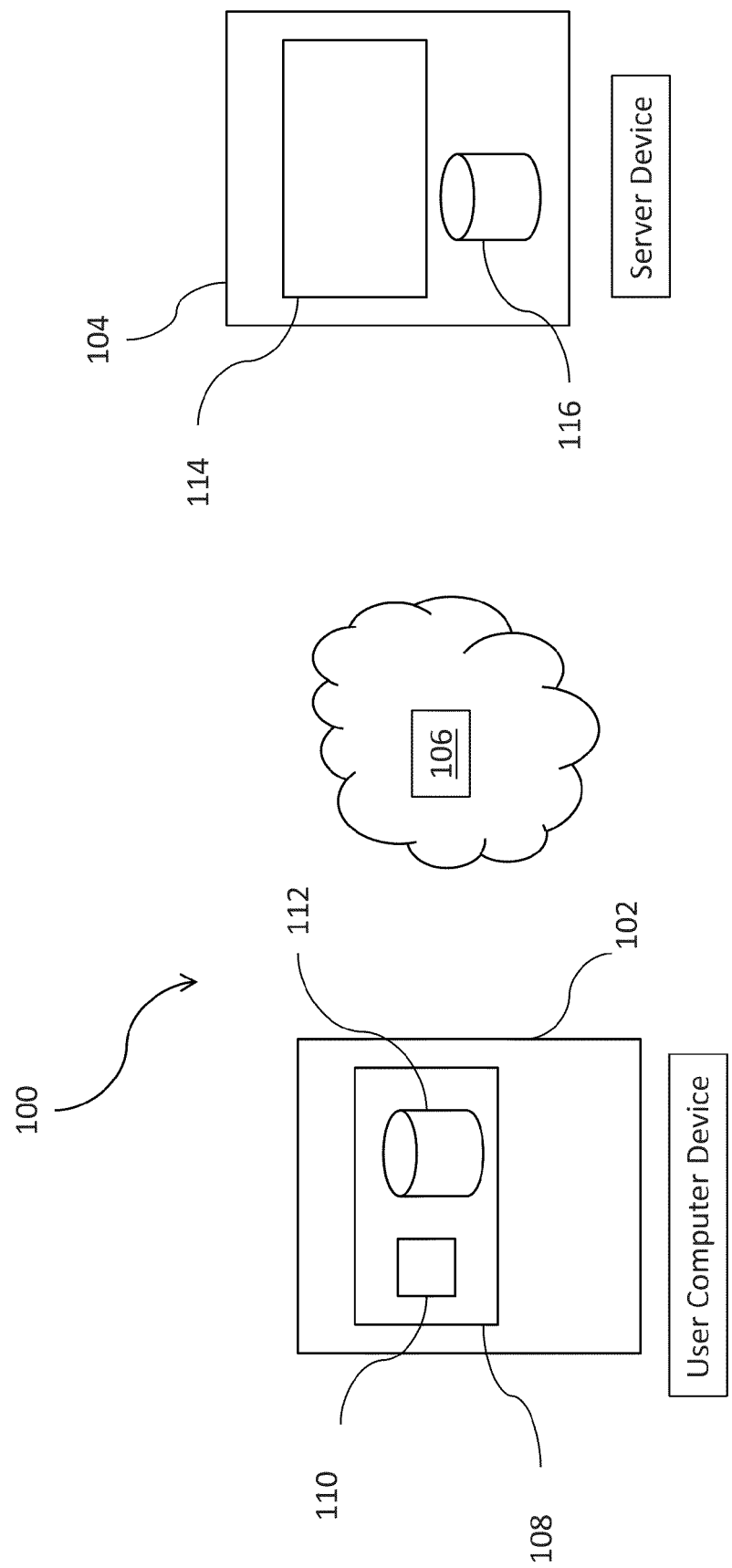
FIG. 1 shows a high-level block diagram of a network configuration for practicing embodiments of the invention.

Referring now to FIG. 1 of the drawings, there is shown a network configuration 100 for practicing embodiments of the present invention. As will be seen, the network configuration 100 comprises a user computer device 102 that is coupled to a server device 104 via an intermediate network 106.

In accordance with different embodiments, the intermediate network 106 may comprise a local area network (LAN) or a wide area network (WAN) such as the Internet.

Figure 5:
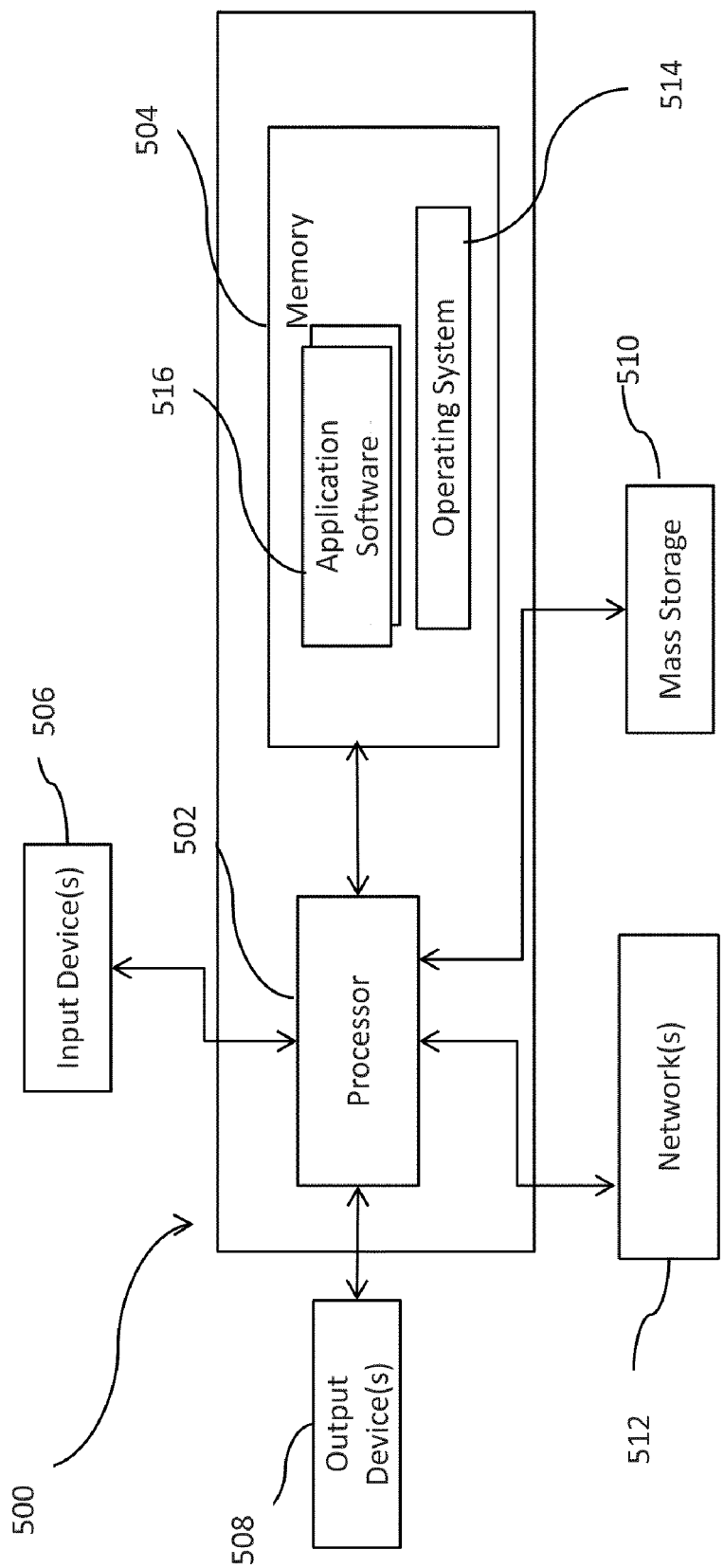
FIG. 5 shows exemplary hardware for implementing a user computer device or a server device, in accordance with one embodiment of the invention.

The user computer device 102 may comprise a general purpose computer embodied in different configurations such as a desktop personal computer (PC), or laptop computer. FIG. 5 of the drawings shows exemplary hardware 400 for implementing the user computer device 102, in accordance with one embodiment.

The user computer device 102 may be provisioned with software that includes a client dictionary application 108 to implement the techniques disclosed herein. The application 108 may comprises a dictionary shell 110 and one or more local dictionaries 112.

The server device 104 may also be implemented using the hardware 500 of FIG. 5. In one embodiment, the server device 104 may be provisioned with server dictionary software 114 to implement the techniques disclosed herein. The server device may also be provisioned with one or more remote or online dictionaries 116.

Figure 2A:
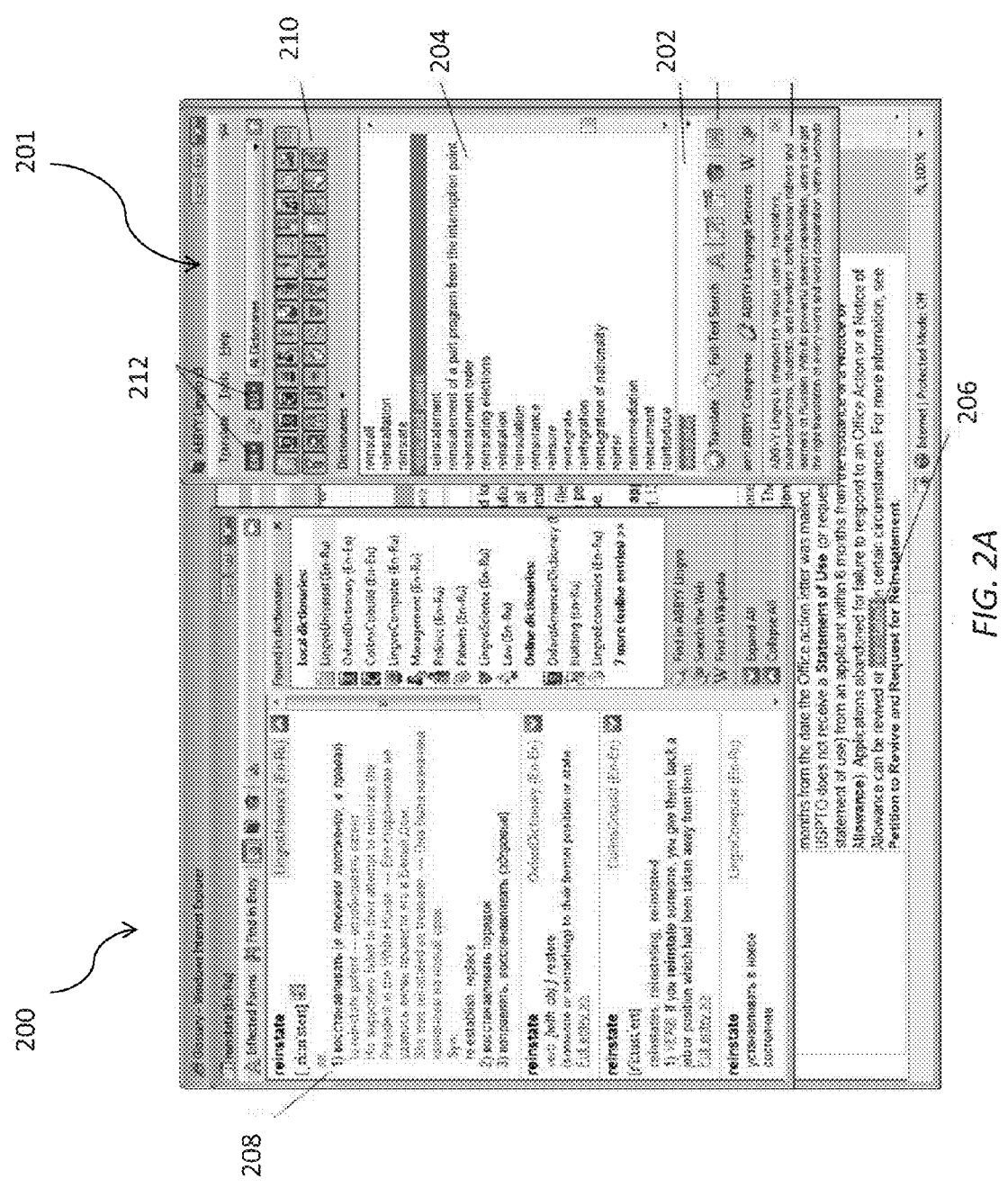
Figure 2B:
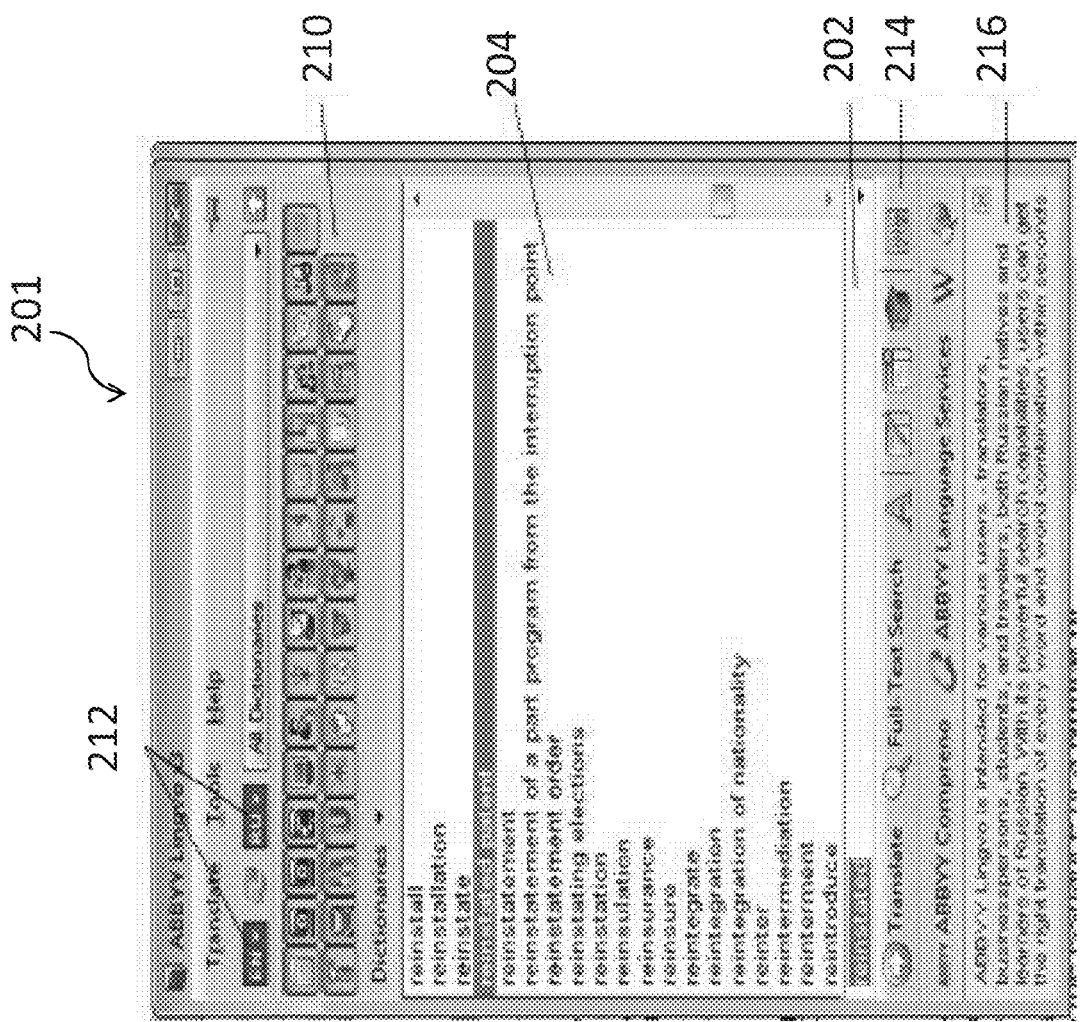
FIG. 2B shows the search control panel of the GUI of FIG. 2A in greater detail.
Figure 2C:
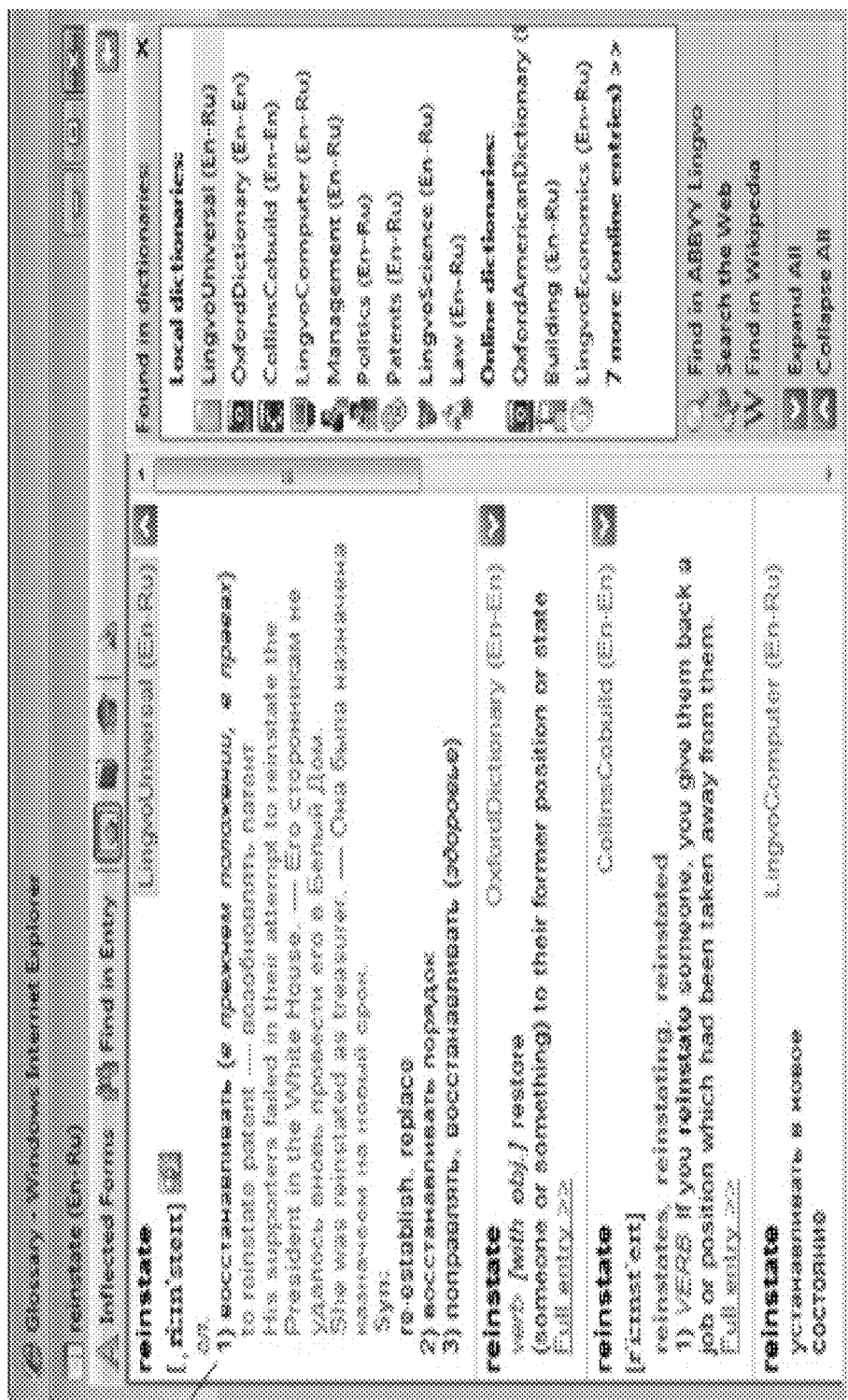
FIG. 2C shows the search control panel of the GUI of FIG. 2A in greater detail.

The dictionary shell 110 may provide a graphical user interface (GUI) to facilitate searching of the local and online dictionaries. One embodiment of the GUI 200 is illustrated in FIG. 2. Referring to FIG. 2, the GUI comprises a search entry window 202 wherein a user can enter one or more words defining a query. Alternatively the GUI 200 may allow the user to select words for a query from a word list 204. In one embodiment, the user can simply select a word 206 defining the query from a text application. One or more dictionary entry windows 208 may be opened if the word is found in local or online dictionaries.

Advantageously, the local and online dictionaries that can be accessed with the application 108 may be presented on a bookshelf 210 for a selected pair 212 of languages.

The bookshelf 210 comprises icons, each representing a particular dictionary, e.g. "Auto", "Accounting", "Computers", etc. In one embodiment, only the dictionaries whose icons are displayed on the bookshelf 210 are used for translation. In another embodiment the search results from other sources may be offered to the user. In some embodiments, a user may be allowed to select or choose a bookshelf from a drop-down list of bookshelves. Available bookshelves may include "All Dictionaries", "General Dictionaries", "Science Dictionaries", etc. A user may disable any dictionary on the bookshelf 210 by clicking on its icon. A disabled dictionary is not used in translation or search even though it is shown on the bookshelf 210. Icons corresponding to disable dictionaries are distinguished visually e.g. they are "grayed out", in one embodiment. One and the same dictionary may be placed on several bookshelves. Enabling or disabling a dictionary on one bookshelf, this does not affect its status on other bookshelves.

In one embodiment, the GUI 200 may include a toolbar 214 to control search parameters such as a parameter to control whether all word-forms of a word are required, a parameter to control the entire text of a dictionary is to be searched, to start a tutor, etc. An information banner 216 may be used communicate information to the user.

Figure 3:
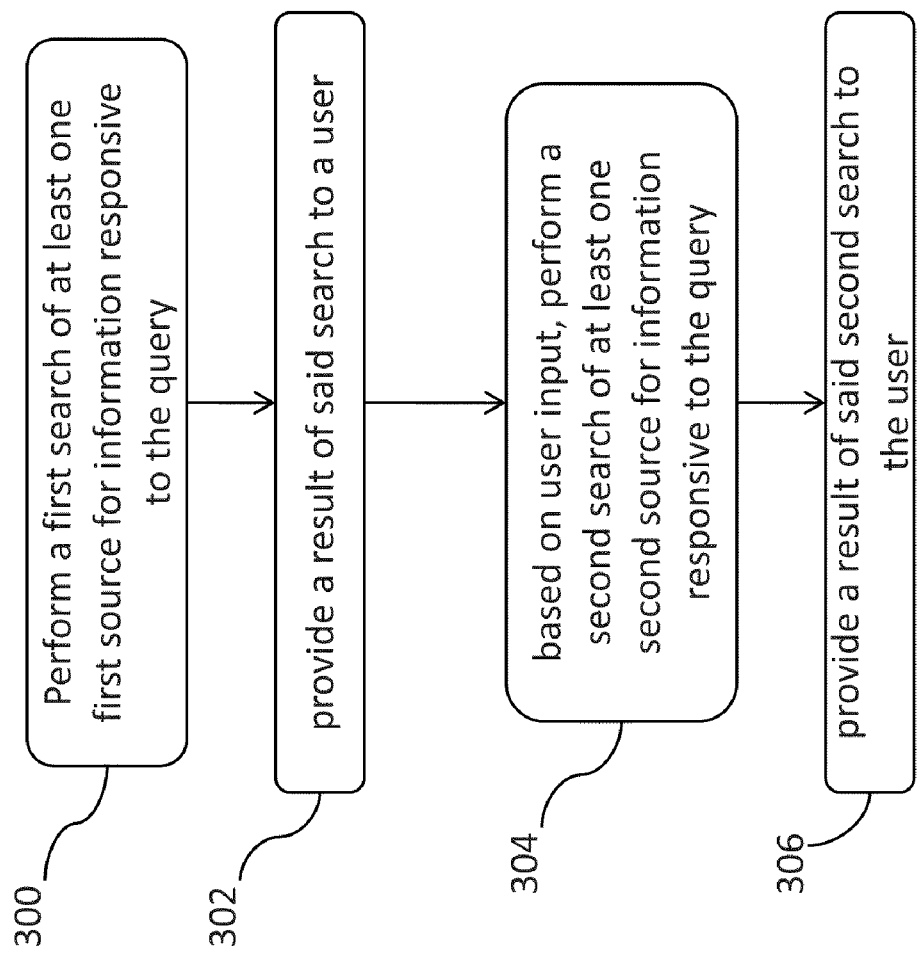
FIG. 3 shows a flowchart of operations performed by client dictionary software, in accordance with one embodiment of the invention.

Referring now to FIG. 3 of the drawings, there in shown a flowchart of operations performed by the client dictionary application 108, in accordance with one embodiment in order to perform a dictionary search or query using the GUI 200. To begin the user enters a search string or query comprising one or a combination of words. The search string may be input using any of the input methods provided by the GUI 200. To recap, the GUI 200 provides a search entry window 202, wherein a search string may be entered. The GUI 200 also provides a word list 204 so that the user can select a word there from to include in the search string. Further, the GUI 200 allows for a word to be selected from a text application so that the selected word forms part of the search string.

Responsive to entry of the search string in the manner described, the client dictionary application 108 performs a search (also "first search") of at least one source (also "first source") for information responsive to a query. The first source may comprise the local dictionaries 112.

At block 302, the result of the first search may be displayed in one or more dictionary entry windows 208. If the user is dissatisfied with the search result, the user can instruct the client dictionary application 108 to perform another search (also "second search"), using the GUI 200 in the manner described above. This latter or second search is of additional dictionaries. In one embodiment the additional dictionaries may comprise various kinds of dictionaries including translation dictionaries, monolingual dictionaries, specialized dictionaries, etc. Additionally, other intranet- or internet resources, such as, text corpora, trademark databases, forums, online-encyclopedias and other resources may be searched. For translation dictionaries, a translation direction (i.e. the source and the target languages) may be established either explicitly or implicitly using the GUI 200. The second search is performed at block 304 and the results thereof are provided at block 306 via one or more dictionary entry windows 208.

In accordance with one embodiment, there may be at least two variants in which additional dictionaries may be located on the server device 104. In the first variant, the shell 110 "knows" about the dictionary. A link to the dictionary is stored in the shell and may be activated by the shell 110 either automatically or optionally. This type of remote dictionary is termed "connected." In the second variant, the dictionary is simply located on the server device 104 which works with distributed shells which do not "know" about the dictionary. This type of remote dictionary is termed "not connected."

In one embodiment, the user may immediately obtain the translations and definitions found both in the locally installed dictionaries and in the online dictionaries. If no entries are found in the local dictionaries, the entries from the online dictionaries are displayed. Entries from online dictionaries may be shown in the same window as local or in separate windows.

In one embodiment, entries from additional dictionaries may be shown as a link which allows the user to see these entries. The additional translations, which are found in "not connected" dictionaries are shown by link, for example, "7 more (online entries)>>." When the user presses the reference additional translations or definitions are downloaded into the dictionary entry window.

In another embodiment, the user may set up the shell to obtain translations from the online dictionaries only upon clicking an appropriate link (e.g. "view entries from online dictionaries").

In still another embodiment, the number of lookups in the disconnected dictionaries may be restricted. For example, the user may have restricted number of free connections and need to make a payment to permanently connect a dictionary or fulfill some other conditions. In this case, each dictionary on the server may be provided with a counter which controls the number of free dictionary lookups available to a user. Once the number of free lookups is used up, the user will still be informed that the dictionary contains the requested word, but the user will need to connect this dictionary to the shell in order to view the entry.

In still another embodiment, the dictionary may be "advertised." In this case, together with the translations from the connected online dictionaries, the user will also obtain translations from the advertised dictionary, but the counter of this dictionary will be disabled for a certain time period for promotional purposes. The entries from the advertised dictionary may include a small advertising banner with a link to a website with detailed information about the dictionary. In one embodiment, the additional dictionaries may be free, created by users etc. The additional dictionaries may be offered based on interface language, regional settings, etc. In one embodiment, the additional dictionaries may be created for restricted user's groups. For this embodiment the additional dictionaries may be downloaded as long as a user belongs to a restricted group.

When connecting a dictionary to the shell, the user may select an installation method: the dictionary may be downloaded and installed locally or it may be used remotely as an online dictionary, i.e. the shell will need to access the server to obtain entries from this dictionary. The shell may also display a catalog of dictionaries located on the server and updated at regular intervals so that the user may see information about dictionaries without visiting the corresponding website, add words from the online dictionary to the wordlist (the list of entries from one or more dictionaries), and display the found translations when the user points the cursor or mouse pointer to a word.

The embodiment of the invention provides the user with additional search results from online dictionaries and may also be viewed as a mechanism for selling dictionary content. A dictionary may be advertised or it may be offered when the user needs to look up words in it, i.e. when there is a matching language pair and entry.

Additionally, the use of online dictionary greatly reduces the size of distribution packages. For example, when a user decides to download a trial version, the size of the distribution package matters. In still another embodiment, the distribution package may include only online dictionaries which the user may download at a later stage if required. Additionally, the user may separately download sound and media files, morphological dictionaries and application resources required for localization.

Figure 4:
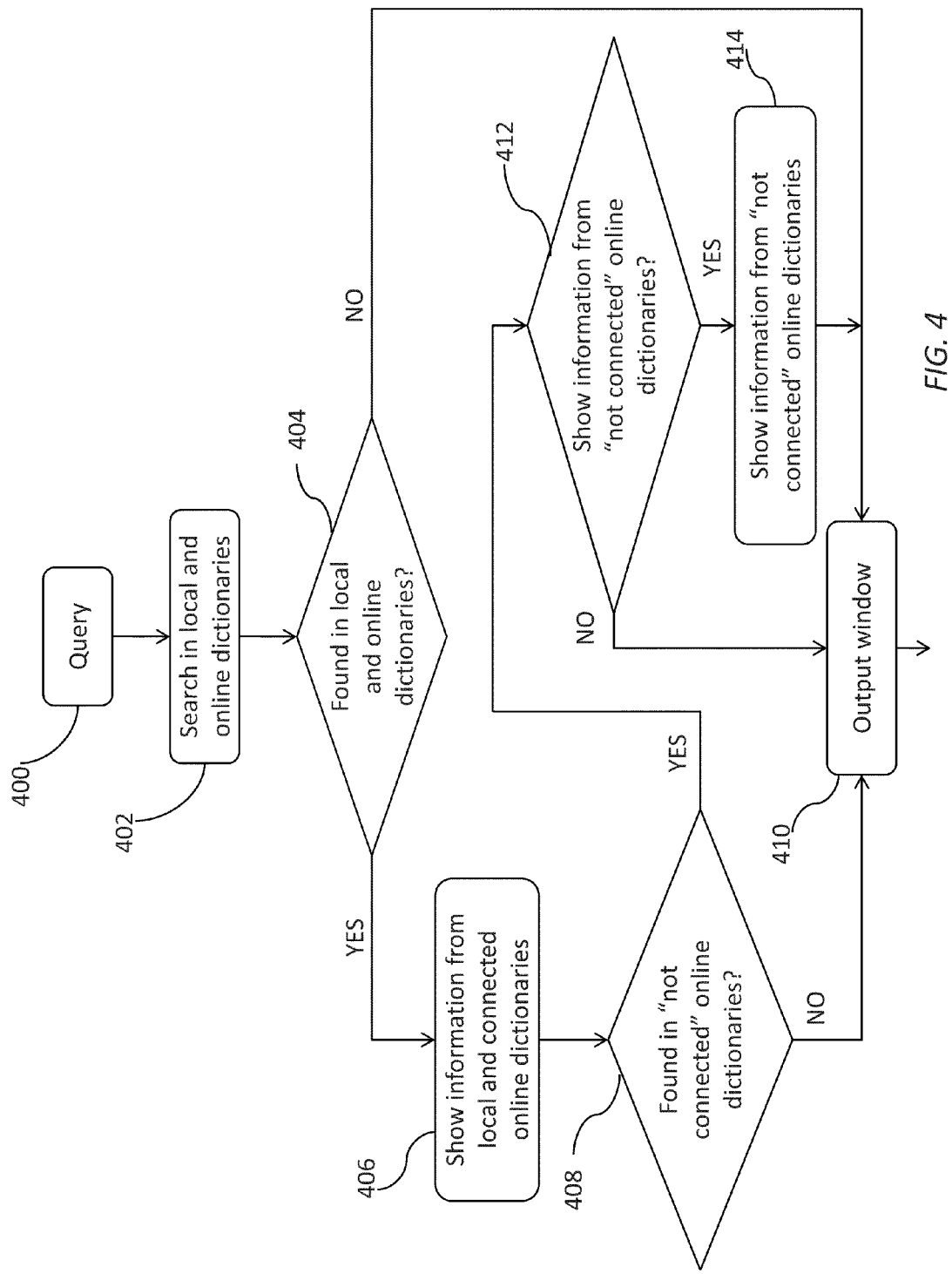
FIG. 4 shows a flowchart of an algorithm for downloading additional search results from the dictionaries, in accordance with one embodiment of the invention.

FIG. 4 of the drawings there is shown a flowchart of an algorithm for downloading additional search results from the dictionaries, in accordance with one embodiment of the invention. Referring to FIG. 4, at block 400 a query in input into the client dictionary application 108 using the GUI 200 as described. At block 402, responsive to the query, a search in performed of local and online dictionaries. At block 404, a determination is made as to whether dictionary entries corresponding to the query was found in the local and online dictionaries. If dictionary entries were found the control passes to block 406 where the entries or information that was found in the local and online dictionaries are displayed or shown to the user. This may be achieved, in one embodiment, using dictionary entry windows 208 of the GUI 200. If no entries are found at block 404, then control passes to block 412. At block 412 the client dictionary application 108 determines if entries or information should be displayed or shown from "not connected" online dictionaries. This is determination is based on user input indicating whether the additional dictionaries should be searched or whether information from the additional dictionaries should be displayed, as described above. Block 414 executes in cases where it is determined that the information from the "not connected" dictionaries should be shown. At block 414, the information from the "not connected" dictionaries is shown, in the manner already described.

In one embodiment, the invention discloses a method for providing custom messages to users. The messages are customized based on type of license under which the dictionaries are provided, the dictionaries used by the client dictionary application 108, etc.

In one embodiment, the information banner 216 may be used for displaying custom messages sent by the server device 104 to the user. These messages may include tips, advertising messages, informational messages, etc. A message may be in the form of a link to a website that contains more information. In one embodiment, the user may close the banner 216, in which case the banner will be displayed again whenever a new message is delivered the server device 104. The user may be allowed to disable the banner 216, in which case it is not displayed again.

The messages may be selected and customized based on the interface language, the regional settings, and the version of the product. Advantageously, trial versions of dictionaries may have different messages from paid or non-trial versions. For example, for the trial versions, a warning message will be sent informing the user that the trial period is about to expire. Additionally, the server device 104 has the capability to detect whether the version used by a user is bootleg or not, and send customized messages to users of bootleg versions.

In one embodiment, the information banner 216 may be used to display tips and advice on working with the product, to inform the user about new dictionaries/releases/products, and to organize competitions and polls. Additionally, the information banner 216 may be used to communicate to the users of the trial versions the benefits of corresponding non-trial versions. The information banner 216 may contain graphics, sound, and other media files e.g. pictures, sound files, Flash content, etc.

FIG. 5 of the drawings shows hardware 500 that may be used to implement the user computer device 102 or the server device 104, in accordance with one embodiment of the invention. Referring to FIG. 5, the hardware 500 typically includes at least one processor 502 coupled to a memory 504. The processor 502 may represent one or more processors (e.g. microprocessors), and the memory 504 may represent random access memory (RAM) devices comprising a main storage of the hardware 500, as well as any supplemental levels of memory, e.g., cache memories, non-volatile or back-up memories (e.g. programmable or flash memories), read-only memories, etc. In addition, the memory 504 may be considered to include memory storage physically located elsewhere in the hardware 500, e.g. any cache memory in the processor 502 as well as any storage capacity used as a virtual memory, e.g., as stored on a mass storage device 510.

The hardware 500 also typically receives a number of inputs and outputs for communicating information externally. For interface with a user or operator, the hardware 500 may include one or more user input devices 506 (e.g., a keyboard, a mouse, imaging device, scanner, etc.) and a one or more output devices 508 (e.g., a Liquid Crystal Display (LCD) panel, a sound playback device (speaker).

For additional storage, the hardware 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 500 may include an interface with one or more networks 512 (e.g., a local area network (LAN), a wide area network (WAN), a wireless network, and/or the Internet among others) to permit the communication of information with other computers coupled to the networks. It should be appreciated that the hardware 500 typically includes suitable analog and/or digital interfaces between the processor 502 and each of the components 504, 506, 508, and 512 as is well known in the art.

The hardware 500 operates under the control of an operating system 514, and executes various computer software applications, components, programs, objects, modules, etc. to implement the techniques described above. In particular, the computer software applications will include the client dictionary application 108, in the case of the client user device 102, and the server dictionary software, in the case of the server device 104. Moreover, various applications, components, programs, objects, etc., collectively indicated by reference 516 in FIG. 5, may also execute on one or more processors in another computer coupled to the hardware 500 via a network 512, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash-memory etc.), among others.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

The invention claimed is:

1. A method for a system to provide information based on a dictionary lookup query, the method comprising:
   performing a first search of at least one first source for information responsive to the dictionary lookup query;
   providing a result of said first search to a component of the system;
   receiving a selection of one of a plurality of collections ("bookshelves") of second sources, wherein each bookshelf of second sources indicates at least one second source to be used in a second search;
   based on a user input, a language pair and a user selection of available second sources, wherein the available second sources are specific to the language pair, wherein the available second sources include a local dictionary and an online dictionary, performing the second search of the at least one second source for information responsive to the dictionary lookup query; and
   providing a result of said second search to the component of the system.

2. The method of claim 1, wherein the at least one first source comprises at least one of local and online dictionaries.

3. The method of claim 1, wherein the dictionary lookup query comprises a dictionary lookup of a word or a phrase.

4. The method of claim 1, further comprising providing a graphical user interface for user interaction with the system.

5. The method of claim 4, wherein the graphical user interface allows input of the first and second search based on input methods selected from the group comprising direct entry of at least one word defining the query in a search entry window, selection of at least one word defining the query from a word list, and selection of at least one word defining the query from a text application.

6. The method of claim 4, wherein providing the result of the second search comprises providing a selectable link in order to view said result.

7. The method of claim 1, wherein the second source comprises a not connected source for which there is no license.

8. The method of claim 7, further comprising allowing a predefined number of searches of the not connected source.

9. The method of claim 7, further comprising providing advertisement information together with the result of the second search.

10. The method of claim 1, wherein the method further comprises:
    displaying a catalog of online dictionaries, wherein the catalog is updated at regular intervals; and
    providing an option to download and install locally an online dictionary thereby providing a local dictionary.

11. The method of claim 1, wherein the method further comprises:
    providing a counter for each online dictionary, wherein each online dictionary is associated with a number of free lookups, and when the counter for an online dictionary exceeds an allowed number of lookups displaying a message that the online dictionary contains the requested query and an indication that an authorized connection is necessary to retrieve results from that online dictionary.

12. The method of claim 1, wherein the method further comprises:
    providing a user interface element for each dictionary such that each dictionary may be placed on several bookshelves, and wherein enabling and disabling of a dictionary on a first bookshelf does not affect its status on other bookshelves.

13. The method of claim 1, wherein the receiving the selection of one of the bookshelves of second sources is through an element of a user interface.

14. A user computer device comprising:
    a processor; and
    a memory coupled to the processor, the memory storing instruction which when executed by the processor cause the user computer device to perform a method comprising:
       performing a first search of at least one first source for information responsive to the query;
       providing a result of said first search to the memory;
       receiving a selection of one of a plurality of collections ("bookshelves") of second sources, wherein each bookshelf of second sources indicates at least one second source to be used in a second search;
       based on a user input, a language pair and a user selection of available second sources, wherein the available second sources are specific to the language pair, wherein the available second sources include a local dictionary and an online dictionary, performing the second search of the at least one second source for information responsive to the query; and
       providing a result of said second search to the memory.

15. The user computer device of claim 14, wherein the at least one first source comprises at least one of local and online dictionaries.

16. The user computer device of claim 14, wherein the at least one second source comprises at least one of local and online dictionaries.

17. A non-transitory computer-readable medium having stored thereon sequences of instructions which when executed by a computer device causes the computer device to perform:

performing a first search of at least one first source for information responsive to the query;

providing a result of said search;

receiving a selection of one of a plurality of collections ("bookshelves") of second sources, wherein each bookshelf of second sources indicates at least one second source to be used in a second search;

based on a user input, a language pair and a user selection of available second sources, wherein the available second sources are specific to the language pair, wherein the available second sources include a local dictionary and an online dictionary, performing the second search of the at least one second source for information responsive to the query; and providing a result of said second search to a user interface.

18. The non-transitory computer-readable medium of claim 17, wherein the at least one first source comprises at least one of local and online dictionaries.

19. The non-transitory computer-readable medium of claim 17, wherein the query comprises a dictionary lookup of a word or a phrase.

* * * * *